(12) United States Patent
Moncada

(10) Patent No.: US 12,718,049 B2
(45) Date of Patent: Aug. 25, 2026

(54) PAYMENT CARD OF MULTIPLE PAYMENT CHIPS

(71) Applicant: Camilo Moncada, Portland, OR (US)

(72) Inventor: Camilo Moncada, Portland, OR (US)

( * ) Notice: Subject to any disclaimer, the term of this patent is extended or adjusted under 35 U.S.C. 154(b) by 127 days.

(21) Appl. No.: 17/739,006

(22) Filed: May 6, 2022

(65) Prior Publication Data

US 2023/0359850 A1 Nov. 9, 2023

(51) Int. Cl.
*G06K 19/07* (2006.01)
*G06K 19/077* (2006.01)
*G06Q 20/10* (2012.01)

(52) U.S. Cl.
CPC ..... *G06K 19/072* (2013.01); *G06K 19/07741* (2013.01); *G06Q 20/105* (2013.01)

(58) Field of Classification Search
CPC ........................................................ H05K 5/00
See application file for complete search history.

(56) References Cited

U.S. PATENT DOCUMENTS

| | | | | |
|---|---|---|---|---|
| 9,697,459 | B2 | 7/2017 | Finn | |
| 10,336,126 | B2 | 7/2019 | Vu | |
| 2009/0065587 | A1 | 3/2009 | Phillips | |
| 2020/0005579 | A1 | 1/2020 | Vu | |
| 2021/0232885 | A1* | 7/2021 | Vu | G07F 7/1008 |
| 2023/0153562 | A1* | 5/2023 | Carroll, II | G07F 7/0826 705/41 |

OTHER PUBLICATIONS

Dangerous Things, "Payment Device Conversion Service," downloaded from https://dangerousthings.com/product/payment-conversion/ (document not dated, downloaded before Apr. 15, 2022).
"Dimple.lo," downloaded from https://dimple.io/ (document not dated, downloaded before Apr. 15, 2022).
"LED Light-up NFC Nail Stickers," downloaded from https://cyborg.ksecsolutions.com/product/led-light-up-nfc-nail-stickers/ (document not dated, downloaded before Apr. 15, 2022).
Ebay.com, "NFC Android Smart Button Battery Free Sticker Shortcut Button," downloaded from https://www.ebay.com/itm/NFC-Android-Smart-Button-Battery-free-Sticker-Shortcut-Button-Black/254744451490?hash=item3b4ff3d9a2:g:2RYAAOSwvflZShZt (document not dated, downloaded before Apr. 15, 2022).
ITWC, "RFID on/off switch in action," downloaded from https://www.youtube.com/watch?v=v-ScOcUD3kE (document hot dated, downloaded before Apr. 15, 2022).
"Lion Card," downloaded from https://lioncreditcard.com/ (document not dated, downloaded before Apr. 15, 2022).
"Parallel Card," downloaded from http://www.parallelcard.com/ (document not dated, downloaded before Apr. 15, 2022).
Worstplans, "tag archives: double-sided credit card," downloaded from https://worstplans.com/tag/double-sided-credit-card/ (document dated Jul. 13, 2015, downloaded before Apr. 15, 2022).

* cited by examiner

*Primary Examiner* — Jerry Wu
(74) *Attorney, Agent, or Firm* — Small Business Legal Clinic; Cera Oh; Joseph Mogavero

(57) ABSTRACT

A set of smart card wallets with a set of smart chips for compact use comprising a body adapted to hold more than one smart chip and a set of coils associated with the set of smart chips for communicating information associated with an account from the set of smart chips.

4 Claims, 5 Drawing Sheets

320
310

300
200
210

230
220

PAYMENT CARD OF MULTIPLE PAYMENT CHIPS

BACKGROUND

Payment cards are frequently used to process payment for purchases or to access information associated with an account. Many payment cards contain one set of payment information or one set of account information. Currently available payment cards may not be diverse enough for the many users of payment cards who often carry multiple payment cards.

SUMMARY

Disclosed herein are embodiments of a method of improving payment cards. A smart card wallet with a set of smart chips for compact use comprises a body adapted to hold more than one smart chip and a set of coils associated with the set of smart chips for communicating information from the set of smart chips.

The above summary is not intended to describe each illustration embodiment or every implementation of the present disclosure.

DETAILED DESCRIPTION

The present disclosure improves current payment cards in multiple ways. Although the present disclosure may describe examples of specific embodiments, one having skill in the art would recognize that the invention should not be limited to those examples.

Payment cards are commonly used as a payment method for one financial institution or to access information associated with an account but can easily become a hassle for users when they must carry multiple payment cards. Some people may struggle locating one particular payment card within their wallet, leading to frustration in situations such as where the payment card must be presented immediately. Some people may feel restricted and bothered by the bulkiness of multiple payment cards. Other people may feel troubled by the amount of plastic multiple payment cards may require.

A smart card wallet capable of holding multiple smart chips may help in reducing the hassle for users by reducing the size, and number of standard payment cards. The smart card wallet may hold various smart chips and may be used in different spatial orientations to access the different smart chips, which communicate information from the various institutions associated with the smart chip. This will help reduce time spent struggling to look through a bulky wallet filled with multiple payment cards to find a specific payment card. The smart card wallet will help streamline access to the data associated with the payment card by making it more convenient for users to be able to use the smart card wallet to access more than one institution depending on how the smart card wallet is used. The smart card wallet will also help conserve plastic by reducing the number of payment cards a user will need to carry in their wallet on a daily basis.

This disclosure describes a reduction in size of a standard payment card (e.g., using the currently embodied smart chips) to be used with other reduced in size payment cards in a smart card wallet. Multiple smart chips can be used in conjunction with the smart card wallet to make it easier for users to carry the equivalent of multiple standard payment cards in one smart card wallet while taking up less space in the user's personal wallet, such as a physical wallet, and reducing the amount of resources used in fabrication of the payment cards.

Figure 1:
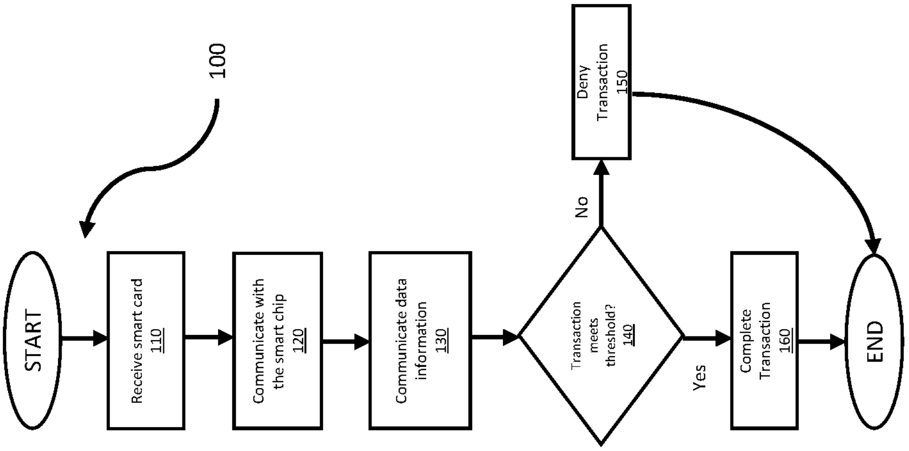
FIG. 1 illustrates a flow chart demonstrating an example method of a transaction processing information associated with an account, according to inventive principles of this present disclosure.

Turning now to FIG. 1, illustrated is a flow chart of an example method 100 for processing payment with the multiple smart chips according to the particular spatial orientation of the smart card wallet, according to embodiments.

At 110, a data processing machine may receive the smart card wallet. Receiving the smart card wallet may include, for example, various methods of using the payment cards such as swiping, inserting, tapping, scanning QR codes, adding for use in smart phone wallets, providing information over the phone for phone purchases, or entering information online for online purchases.

At 120, the data processing machine may communicate with the smart chip within the smart card wallet by interacting with the coils embedded within the particular smart chip and depending on the spatial orientation wherewith the smart card wallet is used. By interacting with the coils, the data processing machine may then receive information associated with the smart chip.

At 130, the data processing machine may communicate with an institution associated with the smart chip in the smart card wallet based on the particular spatial orientation used and the information received. Information, such as banking information, gym membership information, public transportation account information, library membership information, gift card balance information, or loyalty card information, is used by the data processing machine to complete a transaction is stored in the coils by using electrical circuits.

At 140, the data processing machine may determine if the transaction meets a threshold. Meeting a threshold may determine if the transaction will be successful. Meeting a threshold may include, for example, passing security measures to prevent fraudulent purchases, checking with the financial institution to ensure there are enough funds in the account, accessing payment information associated with the smart chip to ensure it is accurate, checking with the systems to see if an account exists, etc.

At 150, in response to a determination, at 140, that the transaction does not meet the threshold, the transaction may be denied. Denial of a transaction may cause the produced smart card wallet in the particular spatial orientation to be rejected. The user must then produce the smart card wallet in the same spatial orientation of the smart card wallet to try again or may produce the smart card wallet in a different spatial orientation of the smart card wallet for the machine to process information from a different smart chip.

If, at 140, the transaction meets or exceeds the threshold, the data processing machine may successfully complete the transaction at 160. Successful completion of a transaction may include causing funds to be withdrawn from the account at the particular financial institution associated with the information provided by the smart chip, accessing an active account in the database associated with the information provided by the smart chip, or causing funds to be withdrawn from an account in the database associated with the information provided by the smart chip. The user has successfully completed the transaction and the smart card wallet may be retracted and put away for future transactions.

Figures 2, 3:
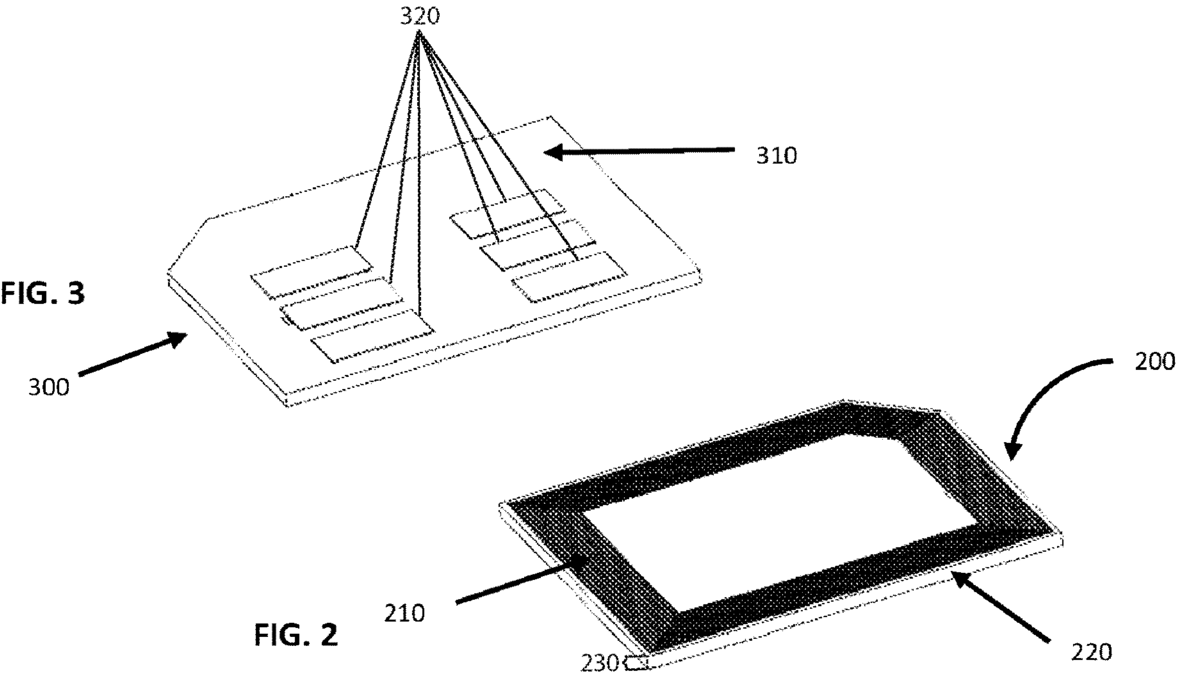
FIG. 2 illustrates an example embodiment of a smart chip in which can be inserted into a smart card wallet, according to inventive principles of this present disclosure.
FIG. 3 illustrates an example embodiment of a smart card wallet with a set of six smart chips, according to inventive principles of this present disclosure.

Turning now to FIG. 2, depicted is a diagram of an example smart chip, according to embodiments. The smart chip 200 is configured to communicate information through various methods while embedded in the smart card wallet (swiping, tapping, inserting). The smart chip includes metal coils 210, such as copper or aluminum, mounted on a flat board containing circuits 220, including a flat sheet of insulating material, surrounding the inside of the smart chip in a rectangular shape. The coils activate when the smart card wallet is received in a specific spatial orientation and act as communicators to communicate information stored as data in the coils of the smart chip to data processing machines. The data may be stored in the coils and retrieved by using electrical circuits within the flat board. Information may include banking information (such as routing number, credit limit, or credit balance) or account information (such as account status, coupon information, or reward status) from the financial institution associated with the smart chip. In embodiments, the information may include a tokenization scheme that, when combined with an authorized signature or personal identification number (e.g., PIN), may be used to access the user's account at the financial institution without revealing account numbers or other sensitive information about the user and/or the financial institution. Once the smart card wallet is received by the data processing machine, the smart chip may generate a transaction code specifically for that purchase which may communicate encrypted information back and forth via Near Field Communication (NFC).

The smart chip 200 is smaller in size and thickness 230 than your standard payment card. The smart chip 200 embedded in the smart card wallet is about the same thickness as a smart card wallet, with a maximum thickness of 0.5 mm thickness 230, while the standard payment card is 0.84 mm. The smart chip 200 is the size of a standard micro SD card.

Turning now to FIG. 3, depicted is a diagram 300 of an example embodiment of a smart card wallet 300 with more than four spaces 320 for multiple smart chips, according to embodiments. The smart card wallet 300 may be capable of using NFC to communicate with a data processing machine to receive information from the smart chips. The example embodiment may also feature a switch or button inside that grants the NFC permission to communicate only when desired. The spaces 320 may allow the smart chips to be removably incorporated (inserting or embedding) into the smart card wallet 300. By being removably incorporated, the smart chips may be inserted or already come embedded for use. The smart chips may be removed and replaced with a different smart chip if the user desires.

The example embodiment 300 may include six smart chips embedded in the body 310 of the smart card wallet 300. The body 310 of the smart card wallet 300 may include spaces 320 for the smart chips to be embedded. The example embodiment shows variations in which the smart chips may be embedded into the body of a smart card wallet 300. Other similar embodiments could be designed taking into account the capability of having multiple smart chips embedded in the body of a smart card wallet. The presented embodiments are for illustrative purposes and should not be construed as limiting the disclosure in any way, as one with skill in the art would appreciate alternative configurations/layouts of the various smart chips.

Figure 4:
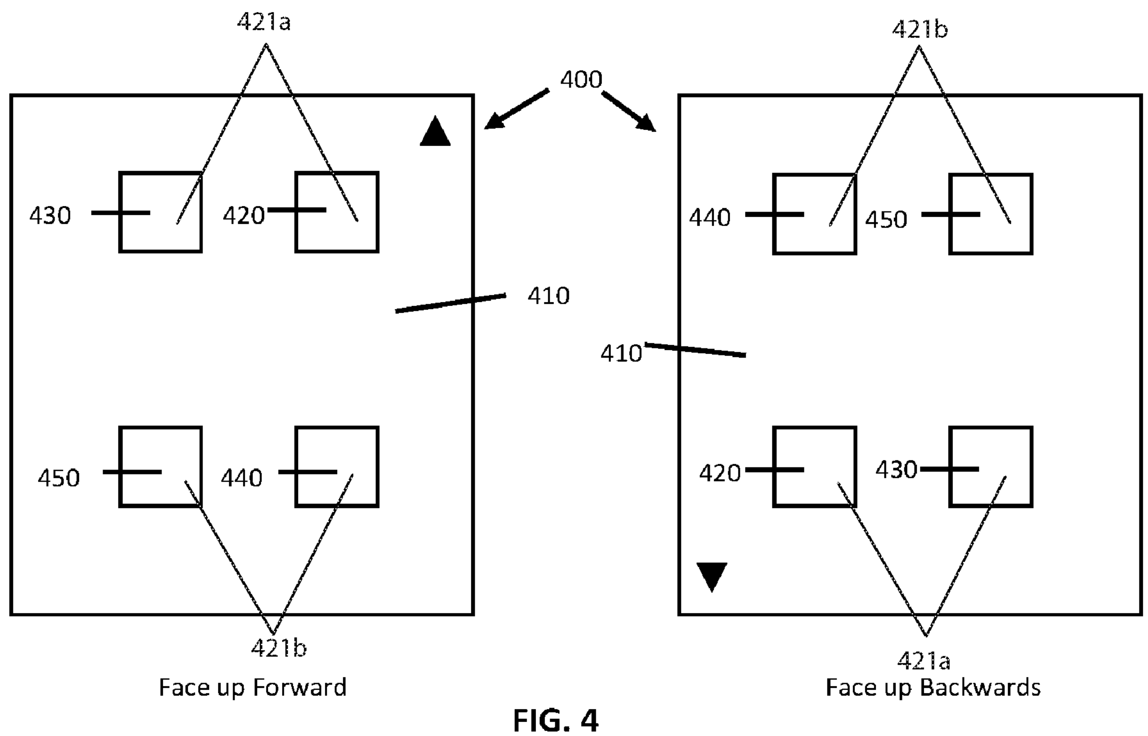
FIGS. 4 and 5 depict example embodiments of a smart card wallet containing a set of smart chips, showing the orientations in which a smart card wallet can be used, according to inventive principles of this present disclosure.

Turning now to FIG. 4, depicted are diagrams 400 of example configurations in which the smart chips 420, 430, 440, 450 of set of smart chips 421*a*, 421*b* embedded in the smart card wallet 410 may be used. The smart chips 420 and 430 are shown together as a subset 421*a* of the set of smart chips 421*a*, 421*b*. The smart chips 440 and 450 are shown together as a subset 421*b* of the set of smart chips 421*a*, 421*b*. Depending on the particular spatial orientation of the smart card wallet, different smart chips containing different information may be used. The upright triangle symbol represents the smart card wallet being used "face up forward" in this example diagram.

The smart card wallet may be used face up forward to communicate information associated with the smart chip 420 with a data processing machine.

The smart card wallet 410 may be used face up backwards to communicate information associated with the smart chip 450 with a data processing machine.

Figure 5:
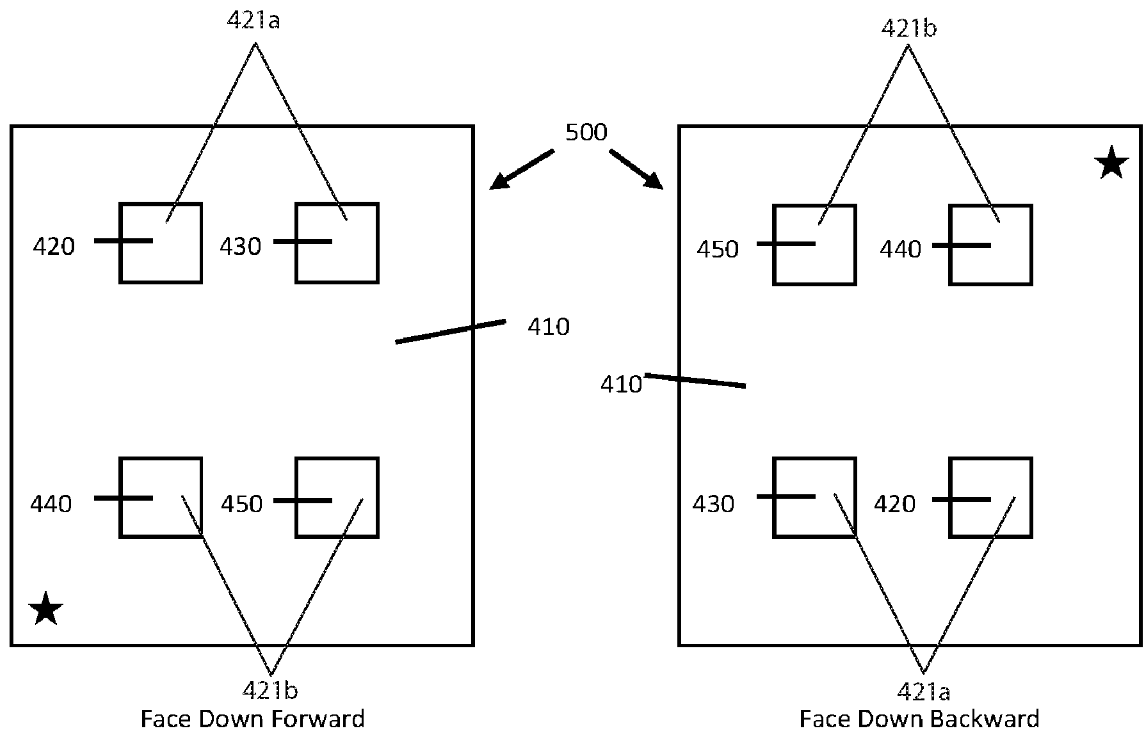

Turning now to FIG. 5, depicted are diagrams 500 of example configurations in which the smart chips 420, 430, 440, 450 of set of smart chips 421*a*, 421*b* embedded in the smart card wallet 410 may be used. The smart chips 420 and 430 are shown together as a subset 421*a* of the set of smart chips 421*a*, 421*b*. The smart chips 440 and 450 are shown together as a subset 421*b* of the set of smart chips 421*a*, 421*b*. Depending on the particular spatial orientation of the smart card wallet, different smart chips containing different information may be used. The star symbol represents the smart card wallet being used face down in this example diagram, consistent with the depiction of FIG. 4.

The smart card wallet 410 may be used face down forward to communicate information associated with the smart chip 430 with a data processing machine.

The smart card wallet 410 may be used face down backward to communicate information associated with the smart chip 440 with a data processing machine.

Figure 6:
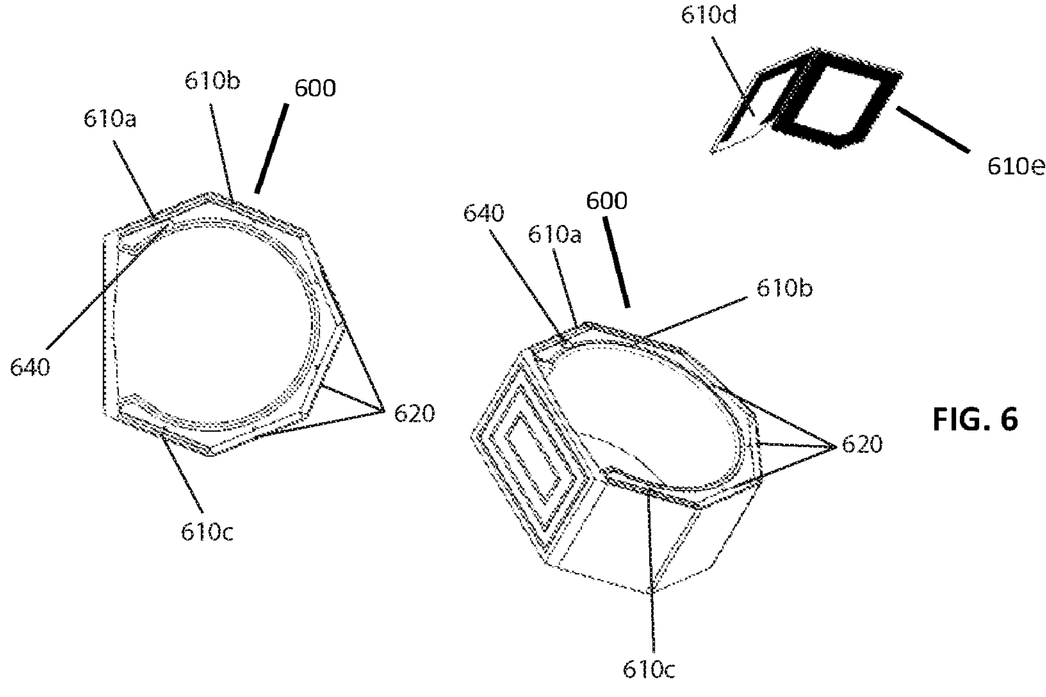
FIG. 6 illustrates an example embodiment of a smart card wallet with more than one smart chip, according to inventive principles of this present disclosure

Turning now to FIG. 6, depicted is an example embodiment of a smart card wallet 600 in which the smart chips embedded in the spaces 610*a*, 610*b*, 610*c* of body of the smart wallet 600 may be used. The empty spaces 620 without smart chips 610*d*, 610*e* are also shown in FIG. 6. The smart card wallet 600 may be used in various embodiments, including jewelry. Depending on the particular spatial orientation of the smart card wallet 600, different smart chips 610*a*, 610*b*, 610*c* containing different information may be used.

The smart chips 610 may be embedded into the smart card wallet in various configurations depending on the various smart card wallet embodiments.

The flowchart and diagrams in the Figures illustrate the architecture, functionality, and operation of possible implementations of smart chips according to various embodiments of the present disclosure.

The descriptions of the various embodiments of the present disclosure are presented for purposes of illustration but are not intended to be exhaustive or limited to the embodiments disclosed. For example, as shown in FIG. 6, the smart card wallet 600 may be equipped with a button 640 configured to activate access to a specific smart card.

What is claimed is:

1. A smart card wallet with a set of smart chips comprising more than one smart chip for compact use comprising: for the smart card wallet, a body comprising at least four spaces, each space adapted to mechanically hold a smart chip of the set of smart chips, wherein each space is configured to allow insertion and removal of any smart chip from the set of smart chips by a user without bending; for each smart chip of the set of smart chips, at least one coil for communicating an account information owned by the user, wherein each smart chip is designed to maintain communicative functionality of the at least one coil upon removal and reinsertion into the spaces; and wherein the set of smart chips is slidably insertable into the spaces and slidably removable from the spaces for customization of the smart cart wallet by the user as desired; and the body further comprises a switch inside that grants a Near-Field Communication permission to communicate with the smart card wallet only when the user desires.

2. The smart card wallet of claim 1, wherein a subset of the set of smart chips are included in the smart card wallet such that the spatial orientation of the smart card wallet determines which smart chip of the subset of the set of smart chips communicates the account information.

3. The smart card wallet of claim 1, wherein a configuration of the smart card wallet is that of a personal accessory.

4. A smart card wallet with a set of smart chips comprising more than one smart chip for compact use, comprising: for the smart card wallet, a body comprising at least four spaces, each space adapted to hold a smart chip of the set of smart chips, wherein each space is configured to allow insertion and removal of any smart chip from the set of smart chips by a user without bending; for each smart chip of the set of smart chips, at least one coil for communicating an account information owned by the user, and wherein each smart chip of the set of smart chips has a maximum thickness of 0.5 mm, and the set of smart chips is slidably insertable into the spaces and slidably removable from the spaces for customization of the smart cart wallet by the user as desired; and the body further comprises a switch inside that grants a Near-Field Communication permission to communicate with the smart card wallet only when the user desires.

* * * * *